United States Patent
Janson

(10) Patent No.: US 7,703,353 B2
(45) Date of Patent: Apr. 27, 2010

(54) DRIVE UNIT CONNECTED TO A TRANSMISSION OUTPUT FOR PRODUCING FORWARD AND REVERSE DEVICE

(75) Inventor: David A. Janson, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 668 days.

(21) Appl. No.: 11/605,785

(22) Filed: Nov. 28, 2006

(65) Prior Publication Data

US 2008/0125268 A1      May 29, 2008

(51) Int. Cl.
*F16H 3/085* (2006.01)

(52) U.S. Cl. .................... 74/665 T; 74/745; 74/355

(58) Field of Classification Search ............... 74/665 T, 74/745, 355
See application file for complete search history.

(56) References Cited

U.S. PATENT DOCUMENTS

| | | | |
|---|---|---|---|
| 1,417,950 A * | 5/1922 | Smalley | 74/343 |
| 2,571,284 A | 10/1951 | Nims | |
| 4,459,872 A | 7/1984 | Tibbles | |
| 4,635,506 A * | 1/1987 | Imaizumi et al. | 74/745 |
| 4,662,240 A | 5/1987 | Greenwood | |
| 4,676,116 A | 6/1987 | Nerstad | |
| 4,735,105 A * | 4/1988 | Kumazawa | 74/378 |
| 4,873,879 A * | 10/1989 | Butterfield et al. | 475/200 |
| 5,339,703 A | 8/1994 | Tanaka | |
| 6,269,899 B1 * | 8/2001 | Izumi | 180/233 |
| 6,446,521 B1 | 9/2002 | Hama | |
| 6,719,656 B2 | 4/2004 | Bowen | |
| 6,814,682 B2 | 11/2004 | Spitale | |
| 6,880,664 B2 | 4/2005 | Pecnik et al. | |
| 6,881,168 B2 | 4/2005 | Bowen | |
| 6,955,627 B2 | 10/2005 | Thomas et al. | |
| 7,011,596 B2 | 3/2006 | Haka | |
| 2002/0160874 A1 | 10/2002 | Bowen et al. | |
| 2003/0051959 A1 | 3/2003 | Blair | |
| 2003/0104892 A1 | 6/2003 | Porter | |
| 2004/0089494 A1 * | 5/2004 | Fukuda | 180/377 |

FOREIGN PATENT DOCUMENTS

GB         2129385         5/1984

* cited by examiner

*Primary Examiner*—Sherry Estremsky
(74) *Attorney, Agent, or Firm*—David B. Kelley; MacMillan, Sobanski & Todd, LLC

(57) ABSTRACT

A drive unit located in a power path between a transmission output and the wheels of a vehicle for reversing the direction of the transmission output includes a gear set including an input driveably connected to the transmission output, and a gearset output alternately rotating in a forward rotary direction and an underdriven reverse rotary direction relative to the speed and direction of the transmission output. A drive mechanism transmits power between the gearset output and the wheels.

11 Claims, 3 Drawing Sheets

DRIVE UNIT CONNECTED TO A TRANSMISSION OUTPUT FOR PRODUCING FORWARD AND REVERSE DEVICE

BACKGROUND OF THE INVENTION

1. Field of the Invention

This invention relates generally to transmitting rotating power in a motor vehicle driveline. More particularly, it pertains to reversing the rotational direction of an input, between a transmission output, connected to the input, and the wheels of the vehicle.

2. Description of the Prior Art

The powertrain of a hybrid electric vehicle includes multiple power sources, an internal combustion engine (ICE), principally used when highway speeds are sustained; an electric motor for charging electric storage batteries, and a traction motor for launching the vehicle, i.e., for accelerating the vehicle from a stopped condition.

In an electric hybrid powertrain for a passenger car, reverse drive is usually produced by a small traction electric motor whose torque capacity is relatively low and is unamplified by the powersplit transmission in the powertrain. The traction motor alone is driven in reverse to launch an electric hybrid vehicle in a reverse direction without assistance from the ICE or torque amplification provided by a transmission or transaxle.

An electric hybrid vehicle that is equipped with all-wheel drive (AWD) or four-wheel drive (4WD) and is expected to tow a heavy load or to be operated on rough terrain may have inadequate reverse drive torque capacity because the output torque of the traction motor is too low for those operating conditions.

Adding reverse gearing to the transmission itself is difficult. There is a need in the industry to increase the magnitude of wheel torque provided in reverse drive especially in the powertrain of electric hybrid vehicle equipped with AWD or 4WD, which is expected to tow a heavy load or to be operated on rough terrain.

SUMMARY OF THE INVENTION

Rather than redesigning existing powersplit transmissions and transaxles, it is an advantage of this invention that reverse gear mechanisms capable of amplifying torque produced by the traction motor are housed in the AWE or 4WD unit.

The reverse gearing is combined with a high range function, by which power is transmitted directly to the vehicle wheels without amplification, and a low range function, by which power is transmitted to the vehicle wheels after being amplified It is yet another advantage that the reverse gearing can be combined with a planetary differential gear unit, which splits power from the traction motor after being amplified by the gearing into a first portion that is transmitted to the rear wheels and a second portion that is transmitted to the front wheels.

A drive unit located in a power path between a transmission output and the wheels of a vehicle for reversing the direction of the transmission output includes a gear set including an input driveably connected to the transmission output, and a gearset output alternately rotating in a forward rotary direction and an underdriven reverse rotary direction relative to the speed and direction of the transmission output. A drive mechanism transmits power between the gearset output and the wheels.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
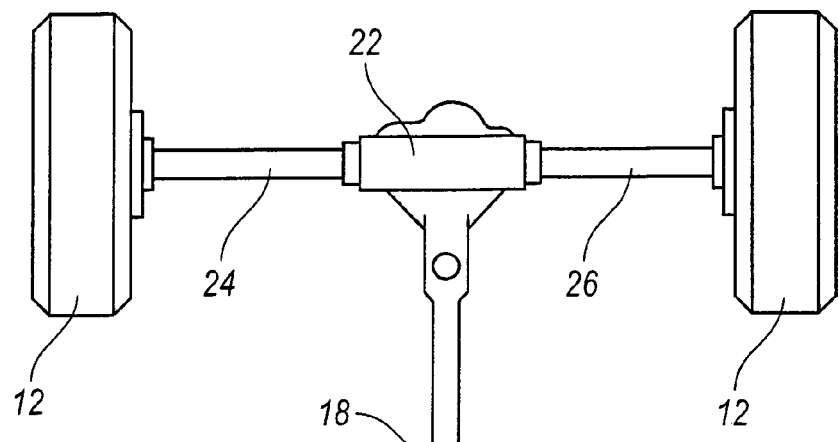
FIG. 1 is a top view of a motor vehicle driveline that includes a transmission, transfer case, and rear differential or axle housing.
Figure 1:
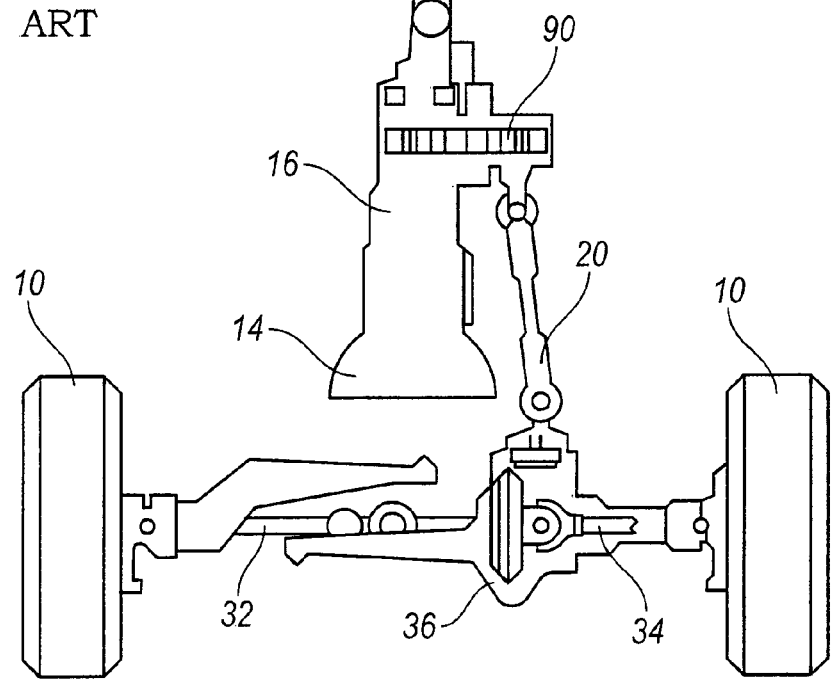

With reference now to the drawings and particularly to FIG. 1, the powertrain of a motor vehicle includes front and rear wheels 10, 12, a power transmission 14 for producing multiple forward and reverse speed ratios driven by an engine (not shown), and a transfer case 16 that continuously driveably connects the transmission output to a rear drive shaft 18. The transfer case 16 selectively connects the transmission output to both the front drive shaft 20 and rear drive shaft 18 when four-wheel drive operation is actuated. Shaft 18 transmits power to a rear wheel differential mechanism 22, from which power is transmitted differentially to the rear wheels 12 through axle shafts 24, 26, which are contained within a differential housing. The front wheels are driveably connected to right-hand and left-hand halfshafts 32, 34, to which power is transmitted from the front drive shaft 20 through a front differential mechanism 36.

The transfer case assembly 16 continually transmits rotating power to the rear driveshaft 18 and rear wheels 12, which comprise the primary power path. The transfer case 16 intermittently transmits rotating power to the front driveshaft 20 and the front wheels 10, which comprise the secondary power path, when a clutch located in the transfer case is actuated.

In the electric hybrid powertrain for a passenger car, reverse drive is usually produced by a small traction electric motor whose torque capacity is relatively low and is unamplified by the powersplit transmission in the powertrain. An electric hybrid vehicle that is equipped with AWD or 4WD and is expected to tow a heavy load or to operate on rough terrain often has inadequate reverse drive torque capacity because the output torque of the traction motor is too low for those operating conditions.

Figures 2, 3:
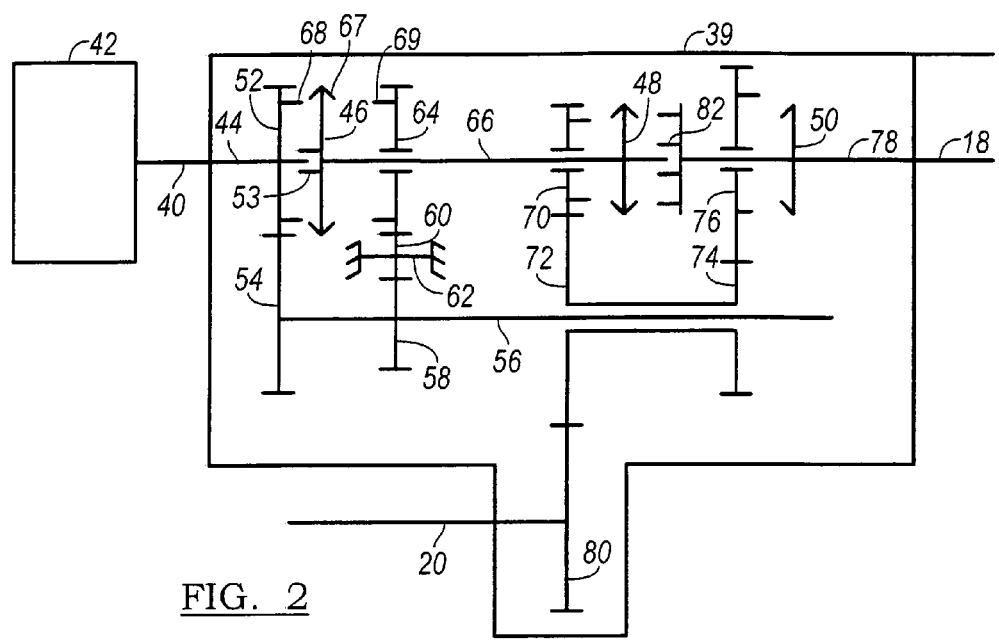
FIG. 2 is a schematic diagram showing a kinematic arrangement for a drive unit that produces forward and reverse drive in a high-range and low-range.
FIG. 3 is schematic diagram showing a kinematic arrangement for a drive unit that produces forward and reverse drive and splits the input torque between front and rear wheels.

To correct this deficiency, the drive unit 39 shown in FIG. 2 has the ability to change the rotational direction of the rear driveshaft 18 and forward driveshaft 20 alternately between forward and reverse depending on the state of a coupler 46. Drive unit 39 driveably connects the transmission output 40 and the vehicle wheels 10, 12 similarly to the function of a transfer case. In addition, the torque produced at the output 40 of a transmission 42, such as a powersplit transmission for an electric hybrid vehicle powertrain, can be amplified by the drive unit 39. Input torque is alternately amplified or transmitted through drive unit 39 without amplification in accordance with the state of a coupler 48. Power is transmitted continually to rear driveshaft 18, and power is transmitted to front driveshaft 20 in accordance with the state of a coupler 50 located in drive unit 39.

A reverse drive power path includes a pinion 52 secured to the drive unit input 44 and supported on a pilot bearing 53, gear 54 meshing with pinion 52 and secured to a layshaft 56, reverse pinion 58 secured to layshaft 56, reverse idler 60 meshing with pinion 58 and supported on an idler shaft 62, coupler 46 secured to intermediate shaft 66, and reverse gear 64 journalled on intermediate shaft 66 and meshing with idler 60.

When the selector sleeve 67 of coupler 46 is moved leftward causing its dog teeth to engage dog teeth 68 formed on or secured to pinion 52, coupler 46 driveably connects intermediate shaft 66 directly to input shaft 44 without a change in rotational direction. When the selector sleeve 67 of coupler 46 is moved rightward causing its dog teeth to engage dog teeth 69 formed on or secured to gear 64, coupler 46 driveably connects intermediate shaft 66 to gear 64 with a change in rotational direction. Reverse gear 64 is driven in the opposite direction from the rotational direction of input shaft 44 through the power path that includes pinion 52, gear 54, layshaft 56, reverse pinion 58, idler 60, and gear 64. In this way, intermediate shaft 66 is underdriven in a reverse direction relative to the direction and speed of input 44.

A power path for producing a low-range and high-range includes a pinion 70, journalled on intermediate shaft 66; a double gear supported on layshaft 56, which includes gear 72, meshing with pinion 70, and gear 74, secured to gear 72; a pinion 76 meshing with gear 74 and journalled on output shaft 78; and coupler 48, secured to intermediate shaft 66. The rear driveshaft 18 is secured to output shaft 78. A pilot bearing member 82 supports the end of intermediate shaft 66 and is secured to output shaft 78.

A coupler 50, secured to output shaft 78, includes a selector sleeve that is moved leftward to its 4×4-state causing its dog teeth to engage dog teeth on pinion 76, thereby driveably connecting output shaft 78 and pinion 76. When the selector sleeve of coupler 50 is moved rightward from its 4×4-state to its 4×2-state, its dog teeth disengage the dog teeth on pinion 76, thereby driveably disconnecting output shaft 78 and pinion 76.

When the selector sleeve of coupler 50 is in its 4×2-state and coupler 48 is moved rightward to the high-range state causing its dog teeth to engage dog teeth on pilot bearing member 82, coupler 48 driveably connects intermediate shaft 66 and output shaft 78. With coupler 48 in this high-range state, output shaft 78 is driven at the same speed and rotational direction as those of intermediate shaft 66.

When the selector sleeve of a coupler 50 is moved leftward to the 4×4 state while the range coupler 48 is in the high-range state, power is transmitted from intermediate shaft 66 through coupler 48, pilot bearing member 82, output shaft 78, and coupler 50 to pinion 76. Gears 74 and 72 are then driven at the same speed and in the reverse direction from the speed and direction of intermediate shaft 66. Gear 72 drives the forward output gear 80 and forward driveshaft 20 in the same direction and at the same speed as those of intermediate shaft 66.

When the selector sleeve of range coupler 48 is moved to the low-range state while the coupler 50 is in the 4×4-state, power is transmitted from intermediate shaft 66 through coupler 48, pinion 70, gear 72, forward output gear 80 and forward driveshaft 20. Gear 72 then functions as a reversing idler, such that output gear 80 and forward driveshaft 20 are underdriven in the same direction as intermediate shaft 66.

FIG. 3 illustrates an alternate embodiment of the kinematic arrangement for drive unit 39. The forward and reversing gear set and drive path, which includes input 44, pinion 52, pilot bearing 53, gear 54, layshaft 56, reverse pinion 58, reverse idler 60, coupler 46 secured to intermediate shaft 66, and reverse gear 64, are substantially identical to those of FIG. 2.

A planetary differential 90 in the form of a simple planetary gear set includes a sun gear 92, secured to output shaft 78 and rear driveshaft 18; a ring gear 94, secured to an output pinion 96; a carrier 98, secured to intermediate shaft 66; and a set of planet pinions 100, supported on carrier 98 and meshing with sun gear 92 and ring gear 94. Pinion 96 is in meshing engagement with an idler 102, which is engaged with an output gear 104, secured to forward driveshaft 20.

The planetary differential 90 divides or splits the torque carried by intermediate shaft 66, one portion of the torque being transmitted to the rear driveshaft 18 the other portion being transmitted to the forward driveshaft 20. The ratio of the pitch diameter of ring gear 94 and that of sun gear 92 determines the relative magnitudes of these torque portions. The torque split produced by planetary differential 90 is not an equal torque split. In the arrangement shown in FIG. 3, the greater portion of the torque carried on intermediate shaft 66 is transmitted to ring gear 94 and front driveshaft 20 than is transmitted to sun gear 92 and rear driveshaft 18.

Alternatively, sun gear 92 can be driveably connected to front driveshaft 20 and ring gear 94 can be connected to the rear driveshaft 18. In that arrangement, the greater portion of the intermediate shaft torque would be transmitted to the rear driveshaft 18 than to the front driveshaft 20.

The planetary differential 90 could be a bevel gear differential mechanism, such as those used in an inter-wheel axle differential to transmit power differentially to left-side and right-side vehicle wheels.

Power from the differential 90 or an alternative differential mechanism can be transmitted to the forward driveshaft 20 through a chain drive mechanism rather than the layshaft drive comprising pinion 96, idler 102 and front output gear, illustrated in FIG. 3.

Figure 4:
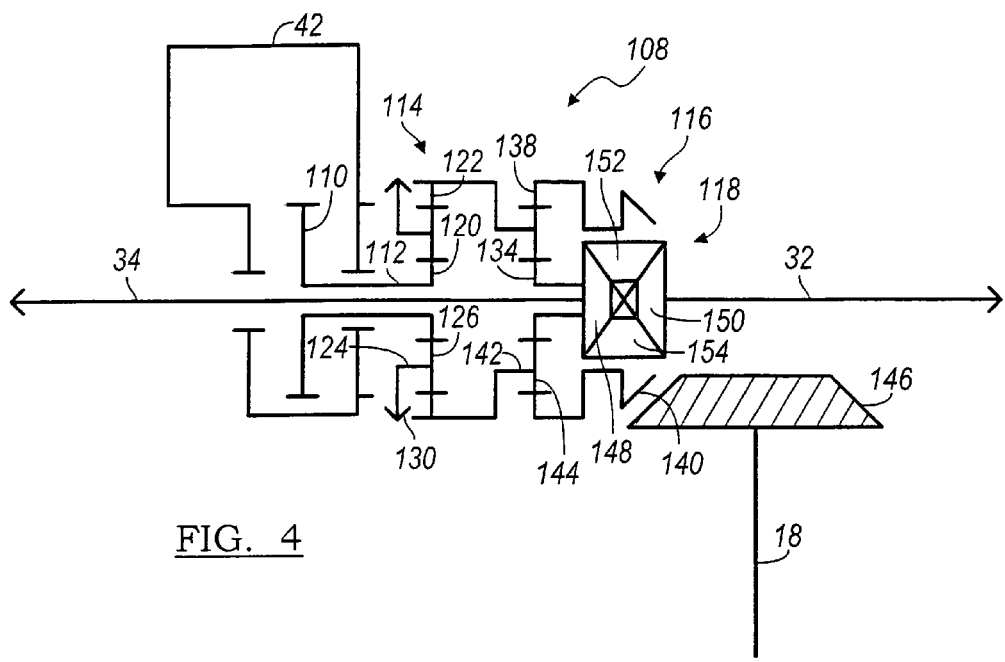
FIG. 4 is schematic diagram showing an alternate kinematic arrangement that produces forward and reverse drive and splits the input torque between front and rear wheels of a front wheel drive.

FIG. 4 illustrates a power take-off drive unit 108 applicable for use in a vehicle whose transmission 42 is arranged transversely with respect to the longitudinal axis of the vehicle. The final drive gear 110 is driveably connected to the input 112 of a forward and reversing gearset 114. The power take-off unit 108 transmits power to the rear driveshaft 18 and forward halfshafts 32, 34 through an inter-axle differential 116 and an inter-wheel differential 118.

The power take-off unit 108 includes a reversing gearset 114, which produces forward or reverse output. The reversing gearset 114 comprises a sun gear 120, secured to input shaft 112; a ring gear 122; a carrier 124; and a set of planet pinions 126, rotatably supported on carrier 124 and in meshing engagement with sun gear 120 and ring gear 122. Coupler 130, secured to carrier 124, has a reversing state, in which carrier 124 is held against rotation, and a forward drive state, in which the carrier is released for rotation and driveably connected to ring gear 122. The selector sleeve of coupler 130 moves leftward to the reversing state, where its dog teeth engage dog teeth on a housing, and it moves rightward to its forward drive state, where its dog teeth engage dog teeth on the ring gear 122.

The output of the reversing gear set 114, ring gear 122, is driveably connected to an inter-axle differential 116, which divides its input torque into a portion transmitted to the front axles and a portion transmitted to the rear axles. The inter-axle differential 116 includes a sun gear 134; a ring gear 138, driveably connected to a bevel pinion 140; a carrier 142, driveably connected to ring gear 122; and a set of planet pinions 144, supported on carrier 142 and meshing with sun gear 134 and ring gear 138. Bevel pinion 140 meshes with a rear output bevel gear 146, which is secured to rear driveshaft 18.

An inter-wheel differential 118 transmits its input torque differentially to the front axles 32, 34. The inter-wheel differential 118 includes a housing secured to sun gear 134, the housing containing a left side bevel gear 148 secured to the left halfshaft 34, a right-side bevel gear 150 secured to the right halfshaft 32, and bevel pinions 152, 154, which are driven by the housing of the inter-wheel differential 118 and are engaged with bevel gears 148 and 150.

In operation, the input sun gear 120 of reversing gear set 114 is driven by the final drive gear 110 of the transmission 42. When the selector sleeve of coupler 130 is moved to the reversing state, carrier 124 is held against rotation and ring gear 122 is underdriven in the reverse direction relative to speed and direction of input shaft 112 and sun gear 120. When the selector sleeve of coupler 130 is moved to the forward drive state, carrier 124 and ring gear 122 are mutually driveably connected, thereby locking up reversing gear set 114 and driving ring gear 122 in the same direction and at the same speed as those of input shaft 112 and sun gear 120.

Inter-axle differential 118 divides or splits the magnitude of torque transmitted to carrier 142 by ring gear 122 into a torque portion carried by ring gear 138 and a torque portion carrier by sun gear 134. In the embodiment illustrated in FIG. 4, a greater portion of the torque transmitted by carrier 142 to the inter-axle differential 118 is transmitted to ring gear 138 and bevel pinion 140 and the rear driveshaft 18 than is transmitted to sun gear 134 and the inter-wheel differential 116.

However, the inter-axle differential 108 can be modified such that sun gear 134 is driveably connected to bevel pinion 140 but not to the housing of the inter-wheel differential 118, and ring gear 138 is driveably connected to the housing of the inter-wheel differential 118 but not to side bevel pinion 140. When the power path is arranged in that way, a greater portion of the torque carried by carrier 142 is transmitted to the inter-wheel differential 116 than is transmitted to the rear bevel pinion 140.

Figure 5:
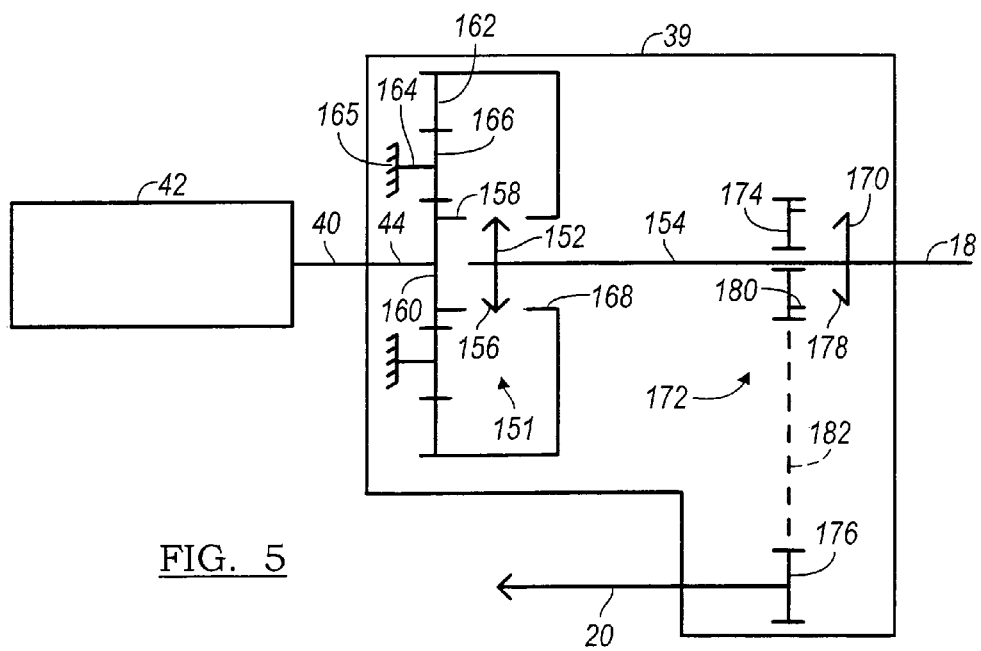
FIG. 5 is schematic diagram showing a kinematic arrangement for a drive unit that produces forward and reverse drive.

FIG. 5 illustrates an alternate forward drive and reversing kinematic arrangement for drive unit 39, in which the output shaft 40 of transmission 42 is secured to the input 44 of the drive unit. A planetary gear set 151 is able to produce alternately forward and reverse output in accordance with the state of a coupler 152, which is secured to the output shaft 154. The reversing gear set 151 further includes a ring gear 162; a carrier 164, held against rotation on the housing 165 of drive unit 39; and a set of planet pinion 166, supported on the carrier and meshing with ring gear 162 and sun gear 160.

When the selector sleeve 156 of coupler 152 is moved leftward, its dog teeth engage dog teeth 158 on a sun gear 160, secured to input 44, thereby producing a direct forward drive connection among output shaft 154, rear drive shaft 18 and input shaft 44.

When the selector sleeve 156 of coupler 152 is moved rightward, its dog teeth engage dog teeth 168, which are secured to ring gear 162. With sun gear 160 driven by the output 40 of transmission 42 and carrier 164 held against rotation, ring gear 162, output shaft 154 and rear drive shaft 18 are underdriven in a reverse direction relative to the speed and direction of sun gear 160.

Coupler 170, secured to shaft 154, is located adjacent a forward drive mechanism 172 for transmitting power to forward driveshaft 20. Drive mechanism 172 may include a pinion 174, journalled on output shaft 154; an idler (not shown) meshing with pinion 174, and a gear 176 meshing with the idler and secured to front driveshaft 20. When the selector sleeve 178 of coupler 170 is moved leftward, its dog teeth engage dog teeth 180 on pinion 174, thereby producing a drive connection between output shaft 154 and forward driveshaft 20. Alternatively, drive mechanism 172 may include a first sheave, journalled on output shaft 154 in the location of pinion 174; a second sheave secured to driveshaft 20 and located in the position of gear 176; and a drive chain or belt 182, engaged with the first and second sheaves.

In accordance with the provisions of the patent statutes, the preferred embodiment has been described. However, it should be noted that the alternate embodiments can be practiced otherwise than as specifically illustrated and described.

What is claimed is:

1. A drive unit, comprising:
    a first gearset including a first input driveably connected to a transmission output, and a first output coupled by the first gearset to the first input, and alternately rotating in a forward rotary direction and an underdriven reverse rotary direction relative to a speed and direction of the transmission output; and
    a mechanism driveably connecting the first output to first and second sets of vehicle wheels.

2. The drive unit of claim 1, wherein the first gear set includes:
    a first sun gear driveably connected to the transmission output;
    a first ring gear;
    a first carrier fixed against rotation;
    first planet pinions supported on the first carrier and meshing with the first sun gear and the first ring gear; and
    a first coupler supported on the first output for alternately driveably connecting the first output to the first ring gear and the first sun gear.

3. The drive unit of claim 1, wherein the first gear set includes:
    a first sun gear driveably connected to the transmission output;
    a first ring gear;
    a first carrier;
    first planet pinions supported on the first carrier and meshing with the first sun gear and the first ring gear; and
    a first coupler supported on the first carrier for alternately driveably connecting the first carrier to the first ring gear and holding the first carrier against rotation.

4. The drive unit of claim 3, further comprising:
    first and second halfshafts, each halfshaft driveably connected to one of a right-side vehicle wheel and left-side vehicle wheel;
    a driveshaft; and
    a differential mechanism that includes:
        bevel gear differential driveably connected to the first and second halfshafts;
        a second sun gear driveably connected to the bevel gear differential;
        a second ring gear;
        a second carrier driveably connected to the first output;

second planet pinions supported on the second carrier and meshing with the second sun gear and the second ring gear;
a bevel pinion driveably connected to the second ring gear;
a gear meshing with the bevel pinion and driveably connected to the drive shaft.

5. The drive unit of claim 1, wherein the first gear set includes:
a first pinion comprising at least a part of the first input and driveably connected to the transmission output;
a layshaft;
a first gear secured to the layshaft and meshing with the first pinion;
a second pinion secured to the layshaft;
a first output gear journalled on the first output;
a reverse idler meshing with the second pinion and the first output gear;
a first coupler secured to the first output for driveably connecting the first output alternately to the first pinion and the first output gear.

6. The drive unit of claim 1, further comprising:
a differential mechanism including a second input driveably connected to the first output, a first differential output and a second differential output, said differential mechanism dividing torque transmitted to the second input into a first torque portion transmitted to the first set of wheels from the first differential output and a second torque portion transmitted to the second set of wheels from the second differential output.

7. The drive unit of claim 1, further comprising:
a first driveshaft;
a second driveshaft; and
a differential mechanism that includes:
a sun gear driveably connected to the first driveshaft;
a ring gear driveably connected to the second driveshaft;
a carrier driveably connected to the first output;
planet pinions supported on the carrier and meshing with the sun gear and the ring gear.

8. A drive unit located in a power path between a transmission output and the wheels of a vehicle, comprising:
a first driveshaft;
a first gear set that includes:
a first pinion driveably connected to the transmission output;
a layshaft;
a first gear secured to the layshaft and meshing with the first pinion;
a second pinion secured to the layshaft;
a first output gear journalled on a first output;
a reverse idler meshing with the second pinion and the first output gear;
a first coupler secured to the first output for driveably connecting the first output alternately to the first pinion and the first output gear; and
a range mechanism comprising a second coupler secured to the first output and a second output, and a gear unit for underdriving the second output relative to a speed of the first output, the second coupler driveably connecting the first output alternately to the gear unit and the first driveshaft.

9. The drive unit of claim 8, wherein the gear unit comprises:
a range pinion connectable by the second coupler to the first output;
an idler supported for rotation on the layshaft, the idler comprising a first idler pinion meshing with the range pinion, and a second idler pinion secured to the first idler pinion; and
a second output gear meshing with the second idler pinion; and
a third coupler supported on the first driveshaft for coupling and decoupling the second output gear and the first driveshaft.

10. The drive unit of claim 8, wherein:
a range pinion is journalled on the first output;
a second output gear is journalled on the first driveshaft; and
further comprising a pilot bearing secured to the first driveshaft and supporting the first output.

11. The drive unit of claim 8, further comprising:
a second driveshaft; and
wherein the gear unit further comprises a second output gear secured to the second driveshaft and meshing with a first idler pinion.

* * * * *